No. 627,458. Patented June 20, 1899.
J. S. HALDEMAN.
COMBINED WHEEL RIM AND TIRE.
(Application filed Aug. 26, 1898.)
(No Model.)
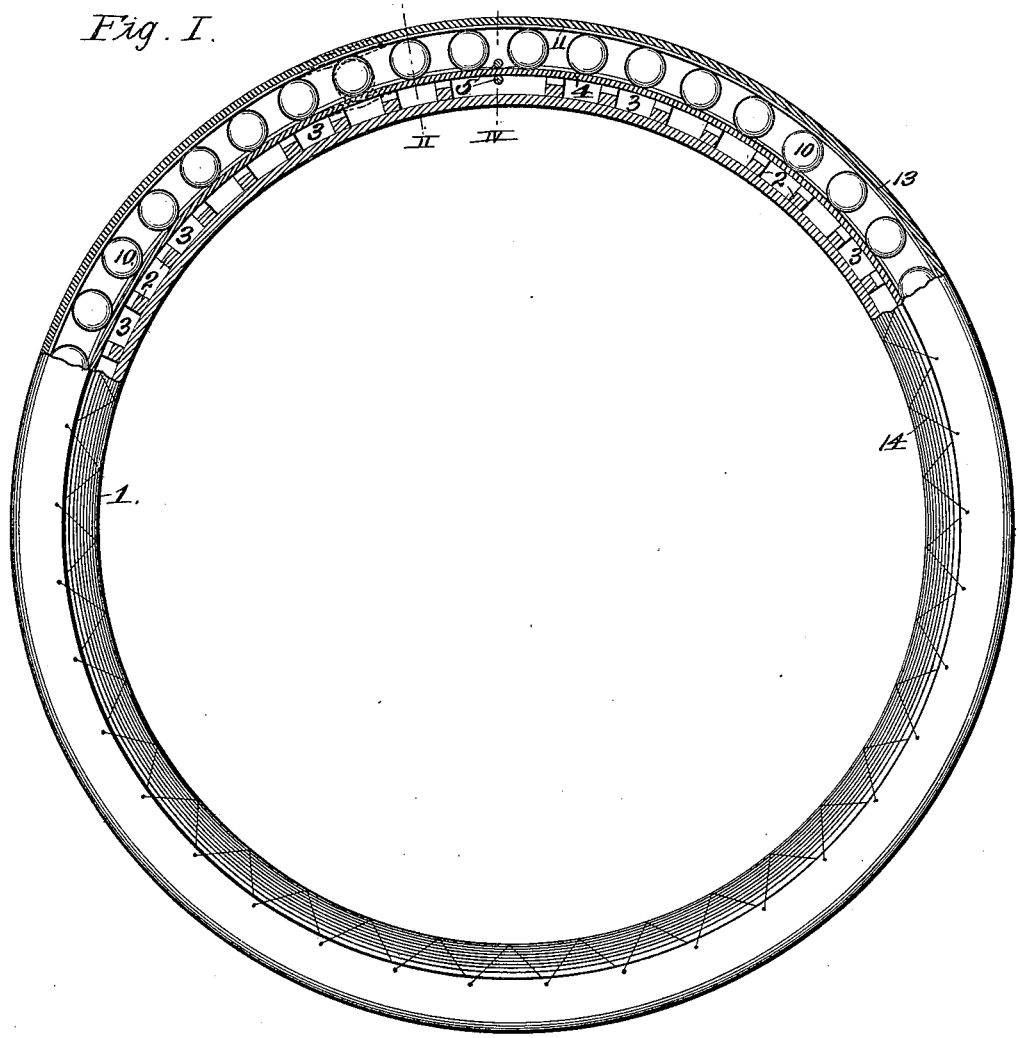
Fig. I.
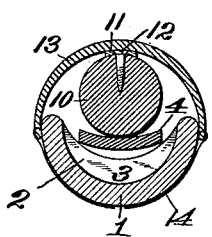
Fig. 2.
Fig. 3.
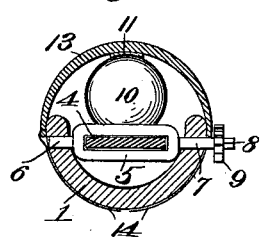
Fig. 4.
Witnesses:
M. R. Romley.
S. Kernahan.
Inventor
J. S. Haldeman.
By Higdon, Fischer & Thorpe
Attys.
THE NORRIS PETERS CO., PHOTO-LITHO., WASHINGTON, D. C.

UNITED STATES PATENT OFFICE.

JAMES S. HALDEMAN, OF CAMERON, MISSOURI, ASSIGNOR OF ONE-HALF TO JOE H. COMBS, OF SAME PLACE.

COMBINED WHEEL RIM AND TIRE.

SPECIFICATION forming part of Letters Patent No. 627,458, dated June 20, 1899.

Application filed August 26, 1898. Serial No. 689,548. (No model.)

*To all whom it may concern:*

Be it known that I, JAMES S. HALDEMAN, a citizen of the United States, residing at Cameron, in the county of Clinton and State of Missouri, have invented certain new and useful Improvements in a Combined Wheel Rim and Tire, of which the following is a specification.

My invention relates to a combined wheel rim and tire; and it consists in certain novel and peculiar features of construction and combinations of parts, as will be hereinafter described and claimed.

The object of the invention is to produce a tire which possesses the advantageous features of a pneumatic tire—viz., its resiliency—without its disadvantages—viz., its collapsibility in case of puncture.

A further object of the invention is to provide a combined wheel rim and tire of the character described which is of simple, durable, and inexpensive construction.

In order that the invention may be fully understood, I will proceed to describe it with reference to the accompanying drawings, in which—

Figure 1 represents, partly in section and partly in side elevation, a combined wheel rim and tire embodying my invention. Fig. 2 represents a section taken on the line II of Fig. 1. Fig. 3 is a side view of part of the combined rim and tire. Fig. 4. is a cross-section taken on the line IV of Fig. 1.

Referring to the drawings in detail, 1 designates a wheel rim or felly provided with the usual peripheral groove or channel, like a bicycle-wheel rim, and 2 designates a plurality of equidistant segmental ribs or bridges bridging said channel and forming between them the pockets or chambers 3. At one point of the rim, however, a bridge 2 is dispensed with, for a purpose hereinafter described.

4 designates a resilient band, preferably of heavy rubber, which encircles the rim and rests upon the bridges 2.

5 designates a rotatable loop through which the band 4 extends. Said loop is arranged transversely of the channel and is provided with trunnions 6 7, journaled in the rim. It may be turned or rotated, but being immovable in other respects forms a substitute for the omitted bridge 2, hereinbefore referred to, and therefore prevents too great a depression of the band 4 at said point, as would otherwise occur each time that point of the wheel came in contact with the ground. In order to rotate this loop conveniently with a wrench (not shown) or equivalent device, one of the trunnions is provided with a squared shank 8 and is also provided with a ratchet-wheel 9, adjacent to said shank.

10 designates balls of aluminium, hard rubber, or any other suitable material, there being one ball upon the outer side of band 4 opposite each pocket or chamber 3, as shown, and said balls are secured reliably in such positions by means of the encircling band 11, of steel or any other suitable material, and, if desired, the balls may be secured to the band by means of screws 12, as shown in Fig. 2.

The tread-surface of the wheel consists of the tire proper, 13, of rubber, canvas, or any other strong and durable material suitable for the purpose. It is endless and preferably semicircular in cross-section, so as to overlap the sides of the rim, and is preferably secured in position by cords or wires 14, laced around the inner side of the rim, as shown, or in any other preferred manner.

When the parts are arranged in the positions described, a wrench is engaged with shank 8 and loop 5 turned a sufficient number of times to tension the band 4, in this operation the band being wound or twisted upon the loop, as will be readily understood. This tensioning of the band of course expands or distends the tire by forcing the balls collectively outward, so as to draw the rubber tire or covering 13 taut, said tire being sufficiently stiff and heavy in its construction to assume substantially the position shown in Figs. 2 and 4. The loop is secured from back rotation by means of the pivoted dog 15, mounted upon the rim, and said dog is held reliably in engagement with the ratchet-wheel by the spring 16 or its equivalent.

In case this tire receives a puncture or cut it is obvious that such injury does not destroy even temporarily the resilient or elastic property of the tire, and therefore need not be given immediate attention, if needed at all.

As the wheel rotates, the balls are successively pressed up into their respective pockets or openings 3, the band 2 forming an elastic cushion for this purpose and returning the balls to their original positions immediately such pressure is removed. It is clear, therefore, that the tire possesses practically the same resiliency or elasticity as the pneumatic tire and that it is far superior to the latter, because there is no danger of its collapse from causes which usually impair the usefulness for a time of the pneumatic tire. It is obvious, of course, that various changes may be made in the construction of this tire without departing from the spirit and scope or sacrificing any of the advantages of the invention.

Having thus described the invention, what I claim as new, and desire to secure by Letters Patent, is—

The combination of a wheel-rim, provided with a plurality of peripheral pockets or chambers, a resilient or elastic band encircling the rim and bridging said pockets, balls against said band and radially opposite said pockets, a band of resilient matter encircling said balls to hold them in their proper relative positions, a flexible cover or tire proper incasing said band and balls, secured to the wheel-rim, a loop journaled in said rim with the first-named resilient or elastic band extending through it, a ratchet-wheel upon one of the trunnions or journal-arms of said loop at the outer side of the rim, and a spring-actuated pawl engaging said ratchet-wheel to prevent the accidental back rotation of the loop, substantially as described.

In testimony whereof I affix my signature in the presence of two witnesses.

JAMES S. HALDEMAN.

Witnesses:
J. H. COMBS,
W. W. ALLEN.